July 15, 1958  E. J. BUTLER  2,843,388
SELF-TIGHTENING REVERSIBLE CHUCK
Filed Dec. 14, 1956
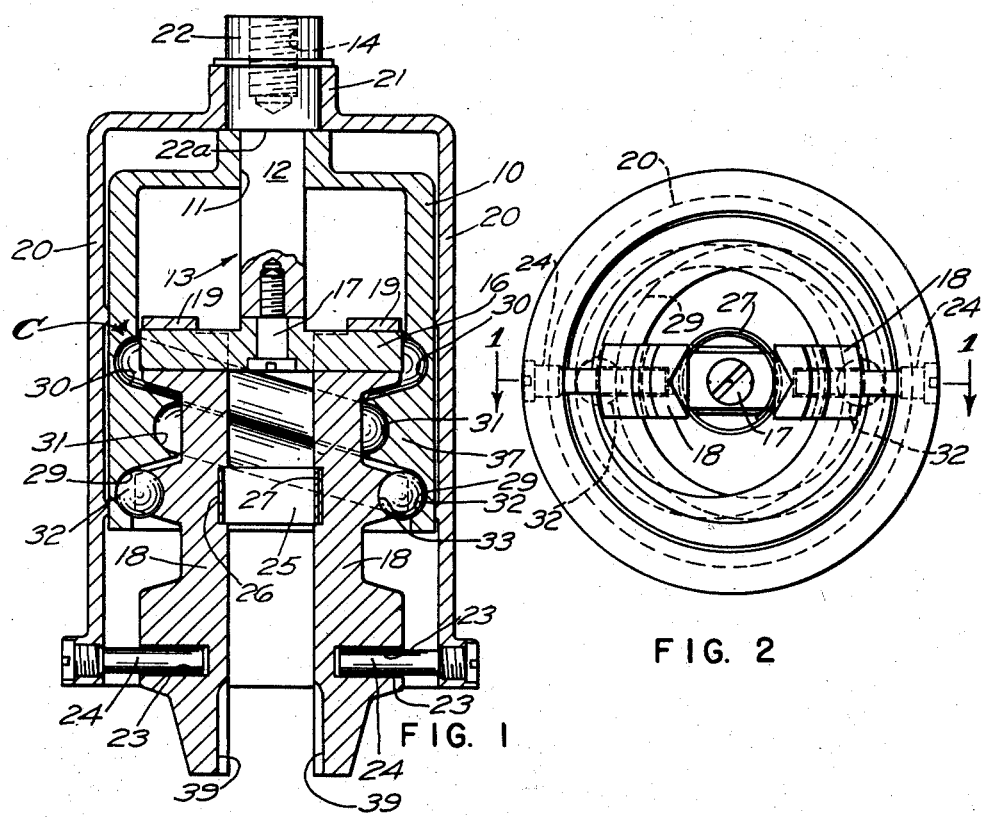
FIG. 1
FIG. 2
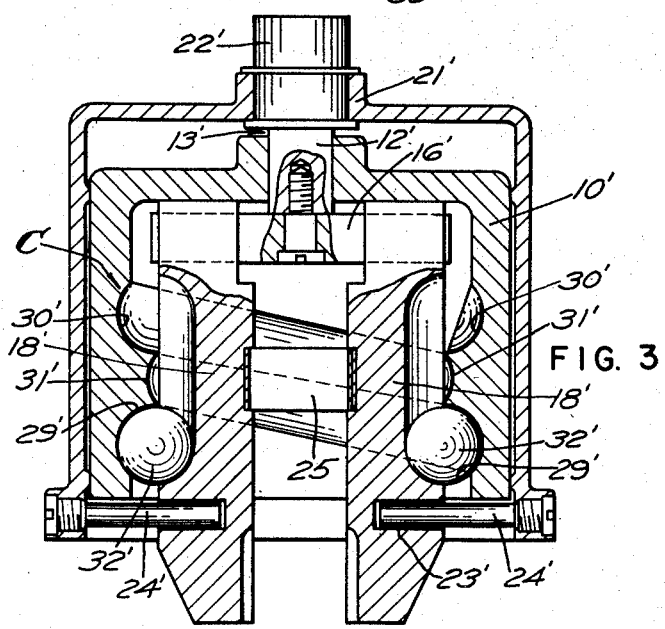
FIG. 3
INVENTOR.
EDWARD J. BUTLER

United States Patent Office 2,843,388
Patented July 15, 1958

2,843,388

SELF-TIGHTENING REVERSIBLE CHUCK

Edward J. Butler, Seekonk, Mass.

Application December 14, 1956, Serial No. 628,357

10 Claims. (Cl. 279—2)

This invention relates to a reversible self-tightening chuck or collet of the one-way clutch type in which rollers disposed between concentrically arranged driving and driven members engage eccentric guide ways in one of said members and, in transmitting a rotational force between the members also transmits a radial thrust to the jaw-forming member or members to cause radial expansion or contraction of the jaws.

In such a chuck as heretofore known, the guide ways for the rollers have been of comparatively limited circumferential extent, and have correspondingly limited the permissible range of radial movement imparted to the jaws of the chuck, thereby limiting the adaptability of the chuck for use with varying sizes of work pieces.

With the foregoing in mind, it is a primary objective of this invention to provide a chuck of the general type above-mentioned which may be arranged to have a considerably greater range of radial jaw movement than has been attainable heretofore.

Also, it is an objective to provide a chuck which embodies a novel mechanism for obtaining a reversibility of its action.

A further object is to provide a mechanism for attaining the above objects which is equally applicable to either an internally driven chuck or a radially expansible chuck or collet.

The foregoing objectives are attained through arranging each eccentric spiral guideway in the one member as a spiral ball channel, having a minimum diameter portion disposed in its medial axial section, the opposite end sections thereof being of gradually decreasing diameter toward the medial section, whereby disposition of the balls or rollers on opposite axial sides of such medial section will cause them to grip and radially expand or contract the jaws of the clutch structure, as they are moved toward said medial section from either direction.

Reversibility of the action of the chuck may be caused simply by relative rotation between the jaws and their associated driver element while the jaws are disengaged from a work piece, to an extent sufficient to move the balls or rollers axially across the minimum diameter medial portions of the channels or guide ways.

In one form of the invention as herein disclosed, the balls or ball detents are rotatably carried at fixed axial locations on the respective jaws while the drive element is movable axially relative to the jaws to compensate for axial displacement of the balls incident to their movement through the spiral channel or guideway of the driving element. In an alternative form of the invention as disclosed herein, the jaws and their drive element are held against relative axial movement while the balls are guided for axial displacement in the respective jaw members and restrained against circumferential displacement relative to these members.

These two specific forms of the invention both incorporate the primary inventive concept and, in addition, include specifically different features embodying patentable novelty per se. Obviously these particular forms or embodiments merely exemplify numerous possible embodiments of the invention and thus the following detailed description is to be construed in an illustrative, rather than a restrictive, sense.

All of the foregoing objectives and advantages are attained by the two embodiments of the invention abovementioned which are illustrated in the accompanying drawings:

Figure 1 is an axial section through a chuck in accordance with the invention, this section being taken on the line 1—1 of Figure 2;

Figure 2 is a bottom-plan view of the structure shown in Figure 1;

Figure 3 is a view corresponding to Figure 1 showing an alternative form of the invention.

Referring now in detail to the accompanying drawings, the driver or drive element 10 is of a generally inverted cup or cylindrical shape formed at its upper or closed end with a flanged square or non-circular opening 11 through which is axially slideably disposed a similar square or non-circular portion 12 of a drive shaft 13. By virtue of the non-circular formation of the shaft portion 12 and the opening 11 there is established a rotary driving connection between the shaft and the driver 10 which, however, permits relative axial movements between these parts, this being the equivalent of any usual splined connection or the like. At its upper end the drive shaft 12 is adapted in any suitable manner as, for instance, by the internally threaded socket 14, for coupling to any usual source of rotary power such as the spindle of a drill, the driving stud of a hand lever or the like.

A spider or cross bar 16 freely rotatably supported by a shoulder screw 17 at the lower end of the shaft 12 exemplifies means for guiding the several jaws 18 of the chuck for relative radial movement within the driver 10 while maintaining them against axial displacement relative to the shaft 12.

To this end the several chuck jaws 18 are formed at their upper ends with integral slide bearings 19 respectively, by which each said jaw member 18 is guided for radial movement on a radial arm of the spider 16.

For radially guiding the lower ends of the chuck jaws 18 as well as for facilitating their manual rotation relative to the driver 10, there is provided an outer cylindrical casing 20, the annular upper end of which has a bearing 21 which rotatably supports the casing on the externally cylindrical upper end portion 22 of the shaft 12 above the driver 10. As thus arranged the housing 20 may also serve conveniently to enclose the several working parts of the chuck.

It will be seen that axial movement of the driver 10 on shaft section 12, will be limited by shoulder 22a, at the lower end of cylindrical portion 22, and with the slide bearings 19 carried on the spider or cross-head 16.

The jaws 18 project downwardly through the open end of the driver and are respectively formed with radial bores 23 for sliding reception of radial guide pins 24 carried by the depending skirt portion of the casing 20. The pins 24 thus guide the lower ends of the respective jaws 18 in their radial movement and also interconnect the jaws and the casing 20 for rotation together. Also this interconnection assists in maintaining the axial position of casing 20 fixed.

In the instant embodiment the jaws 18 are resiliently urged in a radially outward direction by suitable spring means which is shown as comprising an annularly curved flat spring 25 seated in arcuate recesses 26 in the several jaws. This spring has slideably over-lapping ends, as at 27, and its radius of curvature is somewhat greater than that which it is capable of assuming in any operative position of the jaws. Thus the spring will exert constant expansive force on the jaws at all times. By virtue of the annular shape of the spring 25 and its disposition in the recesses 26, it will be seen that a tool shank or spindle may be freely inserted within the jaws and upwardly beyond the spring 25 without being obstructed by the latter.

In order to radially compress the jaws 18 against the expansive action of spring 25 into operative engagement with a tool shank or other object, the driver 10 is formed internally with the spiral ball tracks or guide ways C having interconnected portions which will be referred to hereinafter as 29, 30 and 31, respectively. These guideways or channels are disposed for reception of and cooperation with the balls or rollers 32, respectively, disposed for rotation in hemispherical sockets 33 in the outer faces of the several jaws 18 as shown in Figure 1. The sockets 33 thus journal the balls for free rolling movement along their associated channels C, while preventing both relative axial and circumferential displacement of the balls with respect to their jaws 18.

In the preferred embodiment, the chuck includes two diametrically opposed jaws 18, and there are provided two of the spiral channels C arranged in the manner of a double thread in that the said spiral channels in this case are 180° out of phase with each other so that the balls 32, disposed 180° apart in the respective channels, will be located in a common axial plane and thus will maintain their respective jaws 18 in similar axial positions at all times. Obviously, however, the chuck may employ a greater number of jaws, and a corresponding number of balls and channels.

Medially of the axial length of the respective ball channels, the driver 10 is formed with a radial inward projection in which is disposed the smallest diametric portion 31 of each guide channel, the channels extending respectively from one axial side of this reduced diameter portion or inward projection 37 to the other. In other words, the lower portion or section 29 of each such channel will be of gradually decreasing diameter as it spirals upwardly and inwardly along the side of the inward projection 37, and reaches minimum diameter in the portion 31 which lies in a common radial plane with this inward projection. The minimum diameter portion 31 then merges with the Section 30 which constitutes merely a continuation of the same spiral channel down the other side of the projection whereby the channels are gradually increased upwardly in diameter to a maximum diameter.

With the several parts thus arranged it will be seen that as a tool shank or the like is inserted coaxially within the fully open jaws 18 as shown in Figure 1, the jaws may be initially closed on the shank by manually gripping and rotating the casing 20 in the proper direction relative to the drive shaft 12 and driver 10. Such relative rotation of the casing will be, of course, in a direction to cause relative movement of the balls 32 from a larger diameter portion 29 toward the minimum diameter portion 31 of each of the ball channels to thus bring the jaws into initial engagement with the tool shaft. Thereafter rotational force when applied to the driver 10 through the shaft 12 in a direction opposite to the initial tightening of the casing 20 and against the resistance of the tool carried in the jaws 18 will tend further to tighten the grip of the jaws on the tool shank substantially in proportion to the resistance offered by the tool shank to rotation. It will be seen that in the present embodiment of the invention the driver 10 is moved axially relative to the jaws 18 incident to spiral movement of the balls along the channels.

Where it is desired to relatively reverse the driving direction of the tool, this may be readily done by removing the tool shank from the jaws 18 to leave them unobstructed, then rotating the casing 20 manually relative to the jaws 18 in a direction to cause the balls 32 to pass axially over and beyond the minimum diameter portions 31 of their respective guide channels and into the larger diameter portions 30 thereof. With such disposition the jaws may again be tightened on a tool shank by rotation of the casing in an opposite direction from that which would be required for the same purpose when the balls are positioned in the channel portions 29 as in Figure 1, and rotation of the drive shaft 12 and driver 10 in an opposite direction from that heretofore described will permit a relatively reverse rotary driving movement of the tool.

In order to adapt the chuck jaws for engagement with nuts or the like, to permit its use in the manner of a wrench, the lower ends of the jaws may be provided with angular notches or recesses 39 for engagement with hexagonal or other polygon shaped nuts or bolt heads.

In the modification shown in Figure 3, the construction and operation are substantially the same as heretofore described except that the driver 10' is both axially and radially fixed on the shaft 12' and is thus axially immovable relative to the jaws 18'. In order to permit the necessary axial movement of the balls 32' as they travel along their associated spiral channels, each of the said balls is guided for free axial movement in an axially extending outwardly disposed groove 33' in its respective jaw 18'. Each such groove cooperates with the ball 32' to prevent angular relative displacement of the ball and thus maintains a rotary driving connection between jaws 18' and driver 10'. Accordingly, it will be seen that the overall functioning of the modified mechanism will be similar to that of the preferred embodiment.

Having thus described my invention, I claim:

1. A reversible self-tightening chuck comprising a hollow drive element and means for rotating said element about a predetermined axis, a plurality of jaws, means supporting the jaws in said element concentrically to said axis for rotational and radial movement relative thereto, resilient means urging said jaws radially outwardly, said drive element having a plurality of spirally disposed ball guide channels formed internally thereof, said channels decreasing in diameter progressively from the opposite axial ends thereof to a medial axial portion of minimum diameter, said jaws being formed with ball receiving recesses in their outer faces, balls rotatably seated in the respective recesses and movable along said spiral guide channels, the balls being held in said recesses against circumferential displacement relative to their respective jaws.

2. A reversible self-tightening chuck comprising a drive element and means for rotating said element about a predetermined axis, a plurality of jaws, means supporting said jaws concentrically to said axis for rotational and radial movement relative to said drive element, resilient means urging said jaws in a radial direction, said drive element being formed with a plurality of spirally disposed continuous guide channels varying progressively in diameter from both axial ends thereof to a location medially of said ends, said jaws being formed with ball receiving recesses rotatably seating balls for operative movement along said spiral channels, whereby the varying diameter of said channels will radially move said jaws, continued movement of the balls along said channels from one axial side to the other of said medial location causing a reversal of the radial movement of said jaws, the balls being held in their said recesses against circumferential displacement relative to their respective jaws to transmit a torque from said element to said jaws where radial movement of the jaws is blocked by an object gripped therein.

3. The combination of claim 2 including means interconnecting the said driving element and said jaws against relative axial movement, said ball receiving recesses extending axially of their respective jaws to permit axial displacement of the balls relative to said jaws, as the balls move through said spiral guide channels.

4. The combination of claim 2 including means guiding the said jaws and driving element for relative axial displacement responsive to movement of the balls through said spiral guide channels.

5. The combination of claim 2 wherein said means for rotating the driving element about a fixed axis comprises a drive shaft, the driving element being connected to said drive shaft for relative axial movement, and said jaws being fixedly axially connected to said drive shaft for radial movement relative thereto.

6. The combination of claim 2 including a housing rotatable concentrically about said driving element and said jaws, and having guide means slideably engaging said jaws in a radial direction, said guide means establishing a rotary driving connection between said jaws and said housing.

7. A reversible self-tightening chuck comprising a drive element and means for rotating said element about a predetermined axis, a plurality of jaws, means supporting said jaws concentrically to said axis for rotational and radial movement relative to said drive element, resilient means urging said jaws in a radial direction, said drive element being formed with a plurality of spirally disposed continuous guide channels varying progressively in diameter from both axial ends thereof to a location medially of said ends, radially projecting means carried by said jaws for guided reception in and movement along said spiral guide channels, whereby the varying diameters of said channels will radially move said jaws, said radially projecting means being held by the jaws against rotation around said axis relative to the jaws.

8. A reversible self-tightening chuck comprising a hollow drive element, a plurality of jaws supported in said element for rotation about a predetermined axis relative to said drive element and for movement radially to said axis, resilient means urging said jaws radially outwardly toward said drive element, said drive element having a plurality of spiral guide channels therein, said channels decreasing progressively in diameter from their opposite axial ends to minimum diameters at a medial axial location, radially projecting means carried by said jaws for movement along said guide channels responsive to relative rotation between said drive element and said jaws.

9. A self-tightening chuck comprising a hollow drive element, a plurality of jaws supported in said element for rotation about a predetermined axis relative to said drive element, and for movement radially to said axis, resilient means urging said jaws radially outwardly, said drive element having a plurality of spiral guide channels therein, each said channel having a plurality of relatively axially displaced convolutions of progressively varying diameter, radially projecting means carried by said jaws for movement along said respective channels responsive to the relative rotation between said drive element and said jaws.

10. The combination of claim 9 including a housing enclosing said drive element, said jaws projecting axially from the element, and radial guide pins carried by the housing in operative radial guiding engagement with said jaws, said pins also establishing a rotary driving connection between said housing and the jaws.

No references cited.